(12) United States Patent
Reid et al.

(10) Patent No.: US 6,621,241 B2
(45) Date of Patent: Sep. 16, 2003

(54) SYSTEM AND METHOD FOR REDUCING OSCILLATING TOOL-INDUCED REACTION FORCES

(75) Inventors: Steven L. Reid, Torrance, CA (US); John R. Keller, Santa Barbara, CA (US); Joseph K. Bond, Newbury Park, CA (US)

(73) Assignee: DAC International, Inc., Carpinteria, CA (US)

( * ) Notice: Subject to any disclaimer, the term of this patent is extended or adjusted under 35 U.S.C. 154(b) by 0 days.

(21) Appl. No.: 10/028,501

(22) Filed: Dec. 20, 2001

(65) Prior Publication Data

US 2003/0117099 A1 Jun. 26, 2003

(51) Int. Cl.[7] .......................... H02K 33/00; B25D 17/24
(52) U.S. Cl. ........................ 318/114; 318/460; 318/119; 173/162.1; 81/463
(58) Field of Search ................................. 318/114, 115, 318/119, 460, 686, 649, 611; 81/463; 173/117, 113, 162.1

(56) References Cited

U.S. PATENT DOCUMENTS

| | | | |
|---|---|---|---|
| 4,483,425 A | * 11/1984 | Newman | 318/649 |
| 5,062,012 A | * 10/1991 | Maeda et al. | 318/135 |
| 5,959,427 A | * 9/1999 | Watson | 318/687 |
| 6,472,840 B1 | * 10/2002 | Takahashi | 318/649 |

* cited by examiner

Primary Examiner—Bentsu Ro
Assistant Examiner—Eduardo Colon-Santana
(74) Attorney, Agent, or Firm—Koppel, Jacobs, Patrick & Heybl

(57) ABSTRACT

A system and method for reducing reaction forces induced in a machine frame by an oscillating tool employs a counterforce assembly which is driven to move along linear slides mounted to the machine frame. The counterforce assembly is driven with a drive signal derived from two signals: a first signal which is proportional to the acceleration of the tool, and a second signal which is directly proportional to the velocity of the oscillating tool. By properly-adjusting the acceleration and velocity components of the drive signal, the magnitude of the reaction forces induced in the machine frame by the oscillating tool can be substantially reduced. The counterforce assembly preferably includes a centering means which prevents it from moving to either end of the slide. An accelerometer is preferably mounted to the machine frame to sense its vibration, with the accelerometer output used to adjust the counterforce assembly's drive electronics to reduce vibration to a minimum.

19 Claims, 3 Drawing Sheets

SYSTEM AND METHOD FOR REDUCING OSCILLATING TOOL-INDUCED REACTION FORCES

BACKGROUND OF THE INVENTION

1. Field of the Invention

This invention relates to the field of oscillating tools, and particularly to systems and methods for reducing the reaction forces induced in a machine frame by such tools.

2. Description of the Related Art

Many workpieces are machined by means of an oscillating tool which is mounted to a machine frame. The motion of the tool gives rise to reaction forces, which induce vibrations in the machine frame. These vibrations can be coupled back into the tool and adversely affect the surface of the workpiece.

These reaction forces can be particularly troublesome when machining workpieces which require smooth surfaces, such as spectacle lenses. The reaction forces induced while lathing or surface generating such lenses can produce surface artifacts which result in surface aberrations, or discontinuities, which must then be removed by secondary processes such as fining and polishing. These additional process steps, which must be performed on every workpiece produced, are both costly and time-consuming.

Many approaches have been taken to reduce reaction forces of this sort. For example, U.S. Pat. No. 5,959,427 to Watson describes the application of "reaction cancellation forces" which are applied through the center of gravity of a moving stage assembly. As described in Watson at column 3, lines 58–61, the system is arranged to apply a net reaction cancellation force which is "equal in magnitude to the mass of the stage multiplied by the acceleration of the stage in the stage travel direction."

Unfortunately, the approach described in Watson may be unacceptable in some circumstances. For example, when tool motion is produced using coils driven with magnetic fields, eddy currents are generated which result in drag forces. These drag forces can also be coupled to the machine frame and result in unwanted artifacts on the machined surface. These eddy current drag forces are proportional to the velocity of the coil in the magnetic field; Watson's system does nothing to counter these forces.

SUMMARY OF THE INVENTION

A system and method are presented for reducing reaction forces induced in a machine frame by an oscillating tool, which overcomes the problems noted above. The invention counters forces which arise from both the acceleration and the velocity of the oscillating tool.

Reaction forces are reduced by means of a counterforce assembly, which includes a weight mounted on one or more linear slides, which are in turn supported by low friction bearings mounted to the machine frame which supports the oscillating tool. The weight moves along an axis coaxial to that of the tool. The weight is driven with a driving means responsive to a drive signal which is derived from two signals: a first signal which is proportional to the acceleration of the oscillating tool, and a second signal which is directly proportional to the velocity of the tool. By properly adjusting the acceleration and velocity components of the drive signal, the magnitude of the reaction forces induced in the machine frame by the oscillating tool can be substantially reduced.

The counterforce assembly preferably includes a centering means which prevents the assembly from moving to either end of the linear slides. An accelerometer is preferably mounted to the machine frame to sense its vibration, with the accelerometer output used to adjust the counterforce assembly's drive electronics to reduce vibration to a minimum.

Further features and advantages of the invention will be apparent to those skilled in the art from the following detailed description, taken together with the accompanying drawings.

BRIEF DESCRIPTION OF THE DRAWINGS

FIG. 1b is a side elevation view of the system shown in FIG. 1a.

DETAILED DESCRIPTION OF THE INVENTION

Figure 1A:
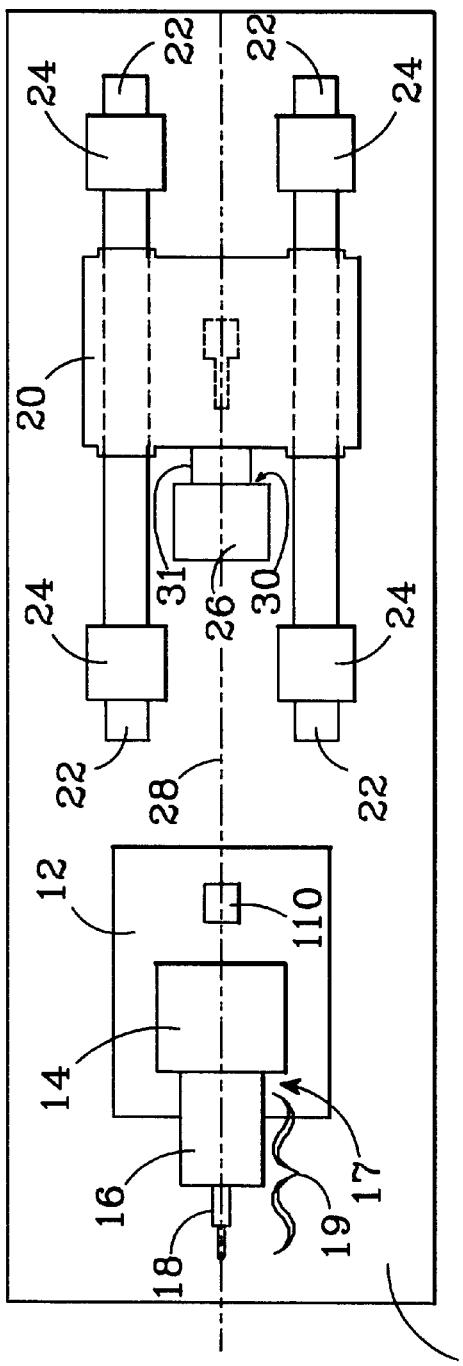
FIG. 1a is a plan view of a system for reducing reaction forces in accordance with the present invention.

A system for reducing reaction forces induced in a machine frame by an oscillating tool is illustrated in FIGS. 1a (plan view) and 1b (side elevation view). A machine frame 10 supports a plate 12 to which a housing 14 is mounted. The housing contains the armature 16 of a voice coil assembly 17, to which a tool 18 is mounted. Drive circuitry (not shown) is used to drive armature 16, which in turn causes tool 18 to oscillate in accordance with the armature's drive signal. Both armature 16 and tool 18 are driven to oscillate; these two components are referred to herein as "tool assembly 19".

A workpiece (not shown) is shaped by being brought into contact with the oscillating tool. For example, by bringing a spectacle lens blank into contact with the oscillating tool while rotating the blank in synchronization with the oscillation, tool 18 is used to machine the lens blank to provide a particular correction.

As noted above, the oscillation of the tool results in reaction forces being induced in the machine frame, which can be transmitted back to the tool and workpiece to cause unwanted artifacts to appear on the workpiece surface. The reaction force $F_r$ at the machine frame 10 is equal to, and opposite in direction, to the force $F_d$ required to drive armature 16. Drive force $F_d$ is given by m·a, where m is the mass and a is the acceleration of tool assembly 19.

To reduce the magnitude of the reaction force $F_r$, a counterforce assembly is used. The counterforce assembly includes a weight 20 which is preferably affixed to a pair of linear slides 22, which are in turn supported by low friction bearings 24. Weight 20 is also coupled to a driving means 26. Driving means 26 moves weight 20 back and forth along slides 22 in response to a drive signal.

In the preferred embodiment, weight 20 and slides 22 move as a unit between bearings 24. Note that, alternatively, linear slide(s) 22 might be mounted directly to machine frame 10, with weight 20 coupled to the slides by means of one or more low friction bearings, such that weight 20 moves along a static slide. Also note that weight 20 might be affixed to a single linear slide, or to more than two linear slides.

The counterforce assembly is arranged such that weight 20 is oscillated at the same frequency as tool assembly 19, along an axis 28 which is coaxial to that along which tool assembly 19 oscillates. To reduce the reaction force induced in machine frame 10 by tool assembly 19, weight 20 is oscillated along axis 28 to produce a force equal and opposite to $F_d$. That is, if $F_d$ is given by:

$$F_d = m_1 \cdot a_1,$$

where $m_1$ and $a_1$ are the mass and acceleration of tool assembly 18, weight 20 is driven to produce an equal and opposite counterforce $F_c$ given by:

$$F_c = -(m_1 \cdot a_1) = m_2 \cdot a_2,$$

where $m_2$ and $a_2$ are the mass and acceleration of weight 20 and any components that are coupled to and thus move with weight 20—referred to herein as "weight assembly 29".

Driving means 26 is preferably a voice coil assembly 30, similar to the voice coil assembly 17 which drives tool 18, such that weight assembly 29 comprises weight 20 and an armature 31. When weight 20 is mounted on linear slides 22 that move between low friction bearings, weight assembly 29 includes slides 22. When so arranged, the drive force $F_d$ applied to tool assembly 19 is equal to the vector cross product of the current $I_1$ applied to voice coil 17 and the magnetic flux in housing 14. This flux is typically provided with permanent magnets; as a result, the flux is essentially constant and $F_d$ is directly proportional to the instant applied current $I_1$. Since $F_d$ is directly proportional to $I_1$, the force necessary to reduce reaction force $F_r$ can be obtained by electronically scaling and inverting $I_1$, and applying the result to voice coil assembly 30. As an alternative to inverting $I_1$, voice coil assembly 30 can simply be wound in the opposite direction from that of voice coil assembly 17.

If the masses of tool assembly 19 and weight assembly 29 are equal, a system as described above—i.e., with voice coil assembly 30 driven with a signal derived from $I_1$—can effectively reduce reaction force-induced vibration of machine frame 10. However, it is difficult to provide exactly equal masses and identically performing voice coil systems for the tool and weight assemblies. The present invention overcomes this by providing an electronic means of controlling and adjusting the counterforce assembly, which also enables the masses of the respective assemblies to be different. Thus, the mass of weight assembly 29 can be greater than that of tool assembly 19, which would result in the distance weight 20 needs to travel in order to counter the reaction forces being less than that of tool armature 16. For example, if the masses of tool assembly 19 and weight assembly 29 are 4 lb. and 20 lb., respectively, weight assembly 29 need move only ⅕ the distance displaced by the tool. The reduced travel distance enables the system to be more compact, and also results in a reduced velocity for weight assembly 29, which tends to reduce the dynamic performance requirements for the counterforce assembly.

This gives rise to a possible source of error: because the distance traveled by tool assembly 19 is greater than that of weight assembly 29, its velocity is also greater. In devices that utilize coils being driven in magnetic fields, eddy currents are generated which result in drag forces, which can couple to the machine frame and result in additional vibration. These eddy current drag forces are proportional to the velocity of the coil in the magnetic field. The drag force $F_v$ due to eddy currents is given by:

$$F_v = k \cdot V_1,$$

where $V_1$ is the velocity of the coil and k is a constant which is a function of the system mechanics. This means that the total force $F_T$ applied to the tool's voice coil is given by:

$$F_T = F_d + F_v = m_1 \cdot a_1 + k \cdot V_1$$

With the masses of tool assembly 19 and weight assembly 29 being different, their respective velocities—and thus their respective drag forces—will also be different.

Tool assembly voice coil current $I_1$ must provide all the forces needed to drive tool assembly 19 in a desired manner. Thus, $I_1$ includes a component necessary to obtain a particular tool assembly acceleration, as well as a component necessary to overcome the velocity-related eddy current drag forces. Therefore, if the signal used to drive weight assembly voice coil 30 is derived from $I_1$, the resulting drive signal will be unable to fully counter the vibration attributable to the tool assembly's eddy current drag forces, due to the unequal velocities of the two masses.

Figure 2:
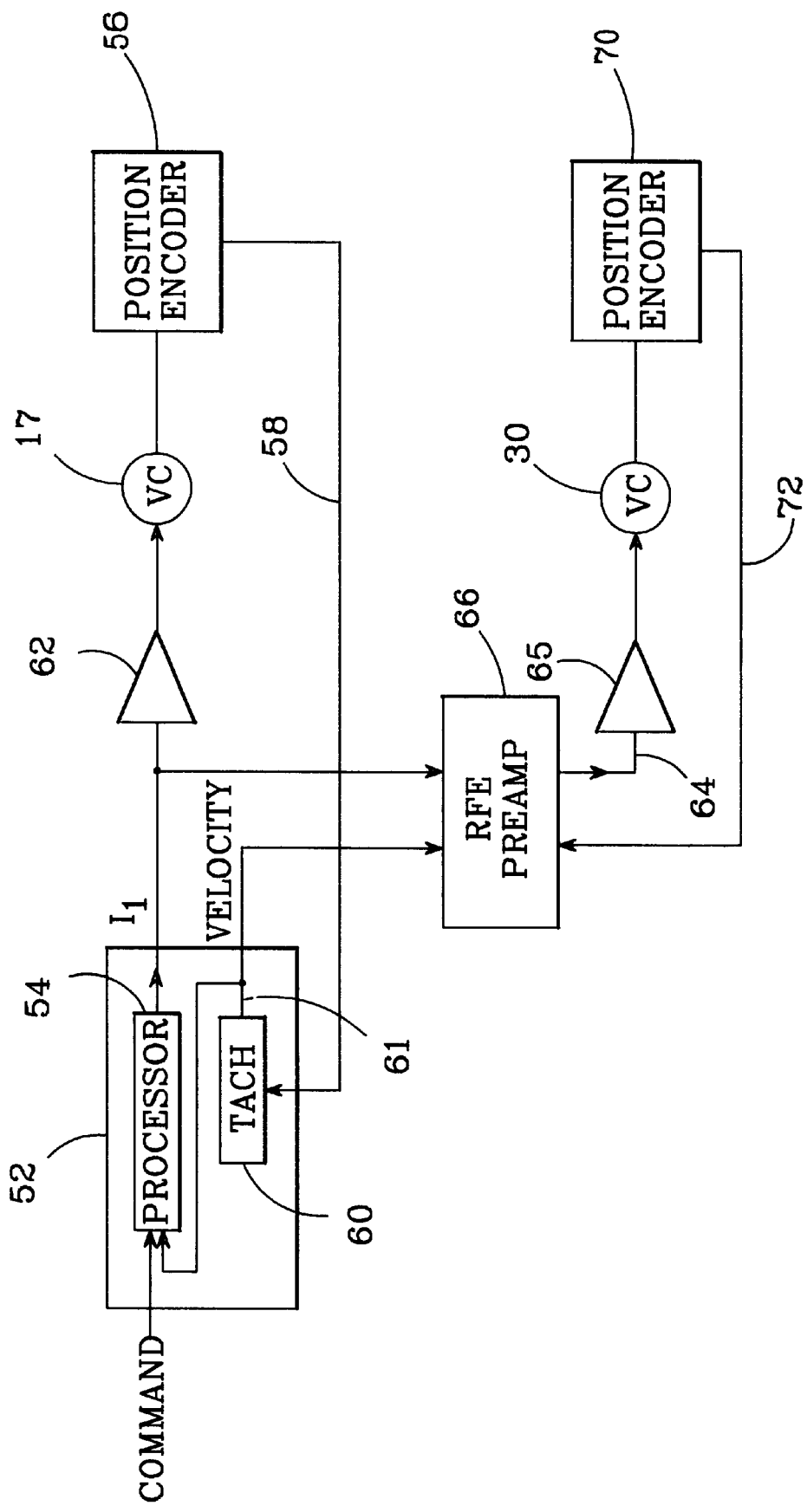
FIG. 2 is a block diagram of drive circuitry suitable for use with a system for reducing reaction forces in accordance with the present invention.

The invention overcomes this problem by recognizing this source of error, and adjusting the motion of weight assembly voice coil 30 to compensate for the error. This compensation is accomplished electronically; a block diagram of such a system is shown in FIG. 2. As noted above, tool assembly 19 is preferably driven with a voice coil assembly 17. The voice coil is driven with a current $I_1$ generated by a control circuit 52. Circuit 52 includes a processor 54 which produces current $I_1$ in response to a COMMAND input which represents a desired tool position, and a velocity input which varies with the velocity of tool assembly 19. Tool velocity is preferably determined by means of a position encoder 56 which produces an output 58 that varies with the position of voice coil assembly 17, and a tachometer circuit 60 which monitors the position output with respect to time to generate an output signal 61 which varies with tool velocity. Current $I_1$ is preferably amplified with amplifier 62 to produce the drive signal for voice coil assembly 17.

The present system also includes the weight's voice coil assembly 30, which is driven with a signal 64 provided by a "reaction force reduction" (RFR) preamplifier 66; signal 64 is preferably amplified with an amplifier 65 to produce the drive signal for voice coil 30. In order to produce a drive signal which can counter the reaction forces induced by tool assembly 19, RFE preamp 66 receives current $I_1$ at an input, and is arranged to vary signal 64 with $I_1$. However, as noted above, when the tool assembly and weight assembly masses are different, a drive signal derived solely from $I_1$ cannot completely counter vibration attributable to the tool assembly's eddy current drag forces. Countering these drag forces requires that preamp 66 also receive velocity signal 61 at a second input, and deriving drive signal 64 from both $I_1$ and velocity signal 61. When velocity signal 61 and current $I_1$ are combined in the proper proportions, both the reaction force-induced vibration of machine frame 10, and the vibration that arises due to the different velocities of the tool and weight assemblies is substantially reduced. This is achieved when the reaction force reduction system is adjusted such that the oscillation of weight assembly 29 produces a counterforce Fc which is equal to $-F_T$.

The force created by the oscillation of tool assembly 19 is primarily related to its acceleration, and is proportional to $\sin\omega t$, where $\omega$ is the oscillation frequency. The force necessary to compensate the tool's eddy current drag forces is related to tool velocity—the integral of acceleration—and is thus proportional to $\cos\omega t$.

Current $I_1$ also includes a component that drives oscillating tool assembly 18 into and away from the workpiece as it oscillates. This component appears in the output 64 of RFR preamp 66, and can cause weight 20 to move until it hits one of bearings 24. This is preferably avoided by keeping the weight centered between the bearings. There are several ways in which the weight can be kept centered. For example, springs could be placed between weight 20 and bearings 24 to keep the weight nominally centered. However, the spring resistance may adversely affect the magnitude of the vibration reduction provided by the oscillating weight. The weight is preferably kept centered with the use of a position encoder 70 which produces a signal 72 that varies with the weight's position. Signal 72 is provided to RFR preamp 66, which maintains the weight's nominal position at a target location. The target position is preferably maintained at a low servo bandwidth so that the higher vibration frequencies reduced by the system are essentially unaffected. To avoid degrading the performance of the reaction force reduction system, position encoder 70 preferably senses position without contacting weight 20, as with a linear variable differential transformer (LVDT).

The low friction bearings 24 supporting linear slides 22 are preferably air bearings.

Figure 3:
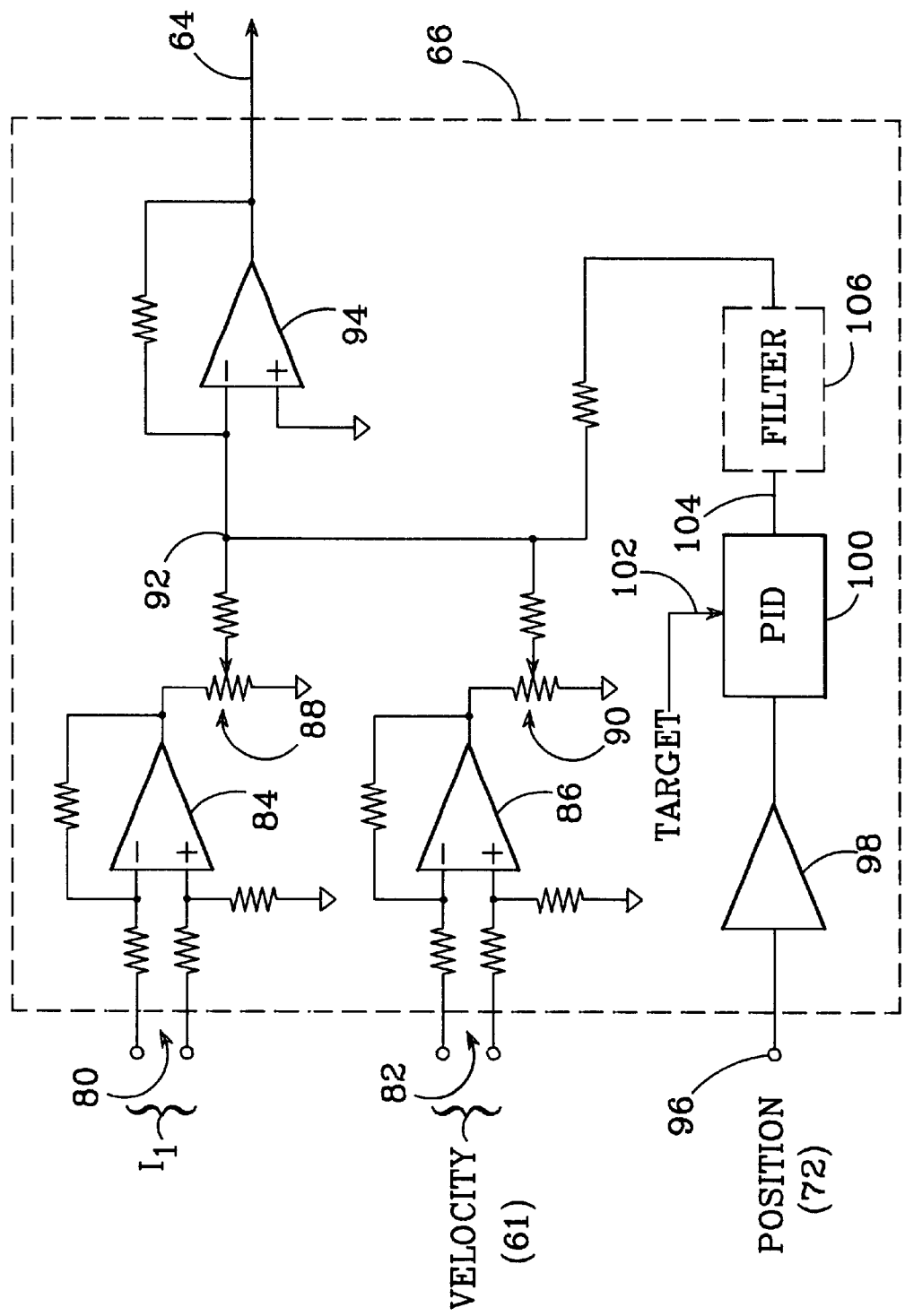
FIG. 3 is a schematic diagram of a preamp circuit suitable for use with a system for reducing reaction forces in accordance with the present invention.

One possible implementation of RFR preamp 66 is shown in FIG. 3. A differential signal derived from current $I_1$ is received at a pair of differential inputs 80, and a differential signal derived from velocity signal 61 is received at a pair of differential inputs 82. Inputs 80 and 82 are fed to respective operational amplifiers 84 and 86, which buffer and provide gain for their inputs. The op amp outputs are fed to respective potentiometers 88 and 90, and the pot taps are connected to a summing node 92 via respective resistors. The summing node is buffered with an amplifier 94, which produces the output 64 of the RFR preamp. In this way, the $I_1$ and velocity inputs are combined to provide the drive signal delivered to voice coil assembly 30. As is discussed in more detail below, potentiometers 88 and 90 are adjusted as needed to reduce the vibration of machine frame 10.

As noted above, the system preferably includes a means of keeping weight 20 centered, with the preferred means being a position encoder 70 which produces a position signal 72. When so implemented, RFR preamp is arranged to receive position signal 72 at an input 96. The position signal is preferably buffered with an amplifier 98, and then provided to a proportional-integral-differential (PID) control circuit 100. Circuit 100 also receives a signal 102 representing the desired target position, and produces an output 104 which is summed into summing node 92, preferably via a filter 106, and thereby coupled into drive signal 64. PID circuit varies output 104 as necessary to keep weight 20 near the target position.

Note that the RFR preamp implementation shown in FIG. 3 is merely exemplary. Many other circuits could be designed which combine the $I_1$, velocity, and position inputs to produce a suitable drive signal.

Figure 1B:
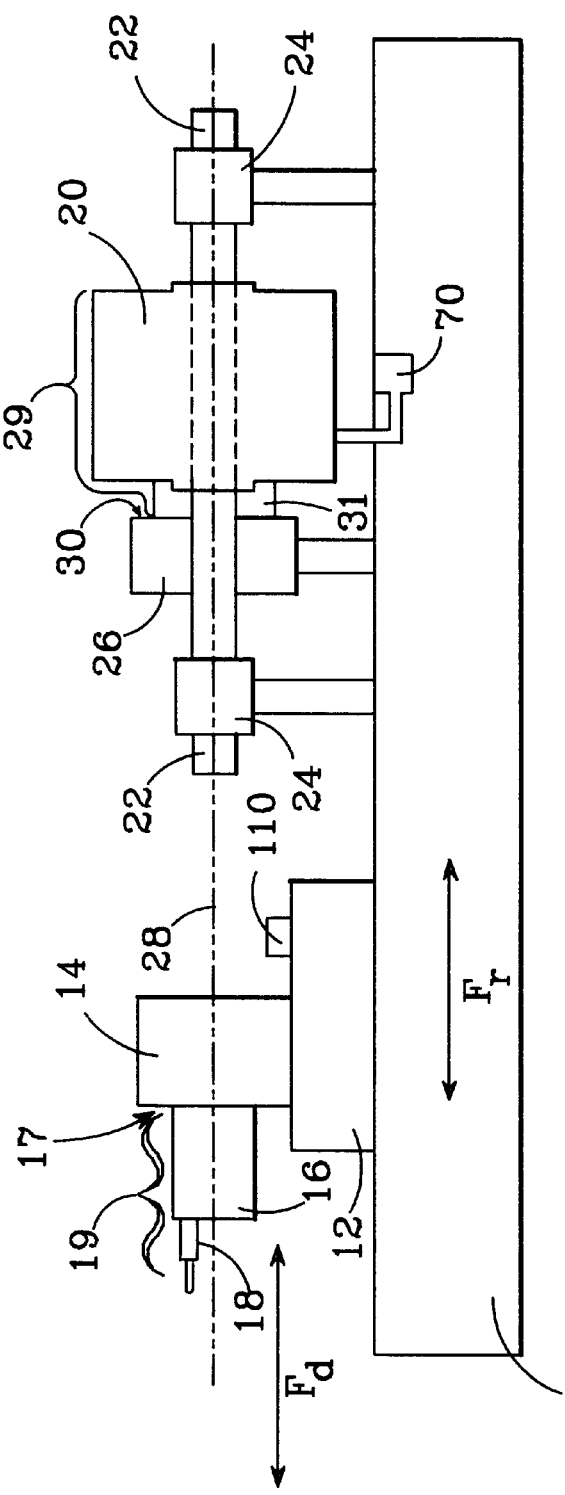

Referring back to FIGS. 1a and 1b, the system is preferably calibrated to achieve a minimum vibration level with the use of an accelerometer 110, which is preferably mounted near tool assembly 19. Accelerometer 110 is typically excited with an interface circuit (not shown), which also receives and amplifies the accelerometer's output. In practice, tool assembly 19 is commanded to oscillate, and the output of accelerometer 110—which varies with the vibration level of machine frame 10—is monitored. RFR preamp potentiometers 88 and 90 are then adjusted as necessary to reduce the magnitude of the accelerometer output—and thus the machine frame vibration—as low as possible.

When properly calibrated, vibration reductions of up to 99% (when compared with a similar oscillating tool system which lacks a reaction force reduction system) are achievable. When employed on a spectacle lens machining system, for example, the number and severity of vibration-induced artifacts on the lens surface is substantially reduced, and the need to perform secondary processes such as fining and polishing may be eliminated.

If calibrated at one oscillation frequency, the reaction force reduction system should be effective at other oscillation frequencies as well. This is because the primary forces—acceleration and velocity—increase and decrease nearly linearly with frequency.

While particular embodiments of the invention have been shown and described, numerous variations and alternate embodiments will occur to those skilled in the art. Accordingly, it is intended that the invention be limited only in terms of the appended claims.

We claim:

1. An apparatus for reducing the vibration transferred to a machine frame by an oscillating tool assembly supported by said frame, said tool oscillating along a first axis, comprising:

a linear sliding means mounted to said frame, a weight mounted on said sliding means, a driving means coupled to said weight and arranged to oscillate said weight on said sliding means along said first axis in response to a first drive signal, and a drive circuit which provides said first drive signal and which receives a first input which is proportional to the acceleration of said oscillating tool assembly and a second input which is directly proportional to the velocity of said oscillating tool assembly, said drive circuit arranged such that said drive signal varies with said first and second inputs to oscillate said weight such that vibration induced in said frame by said oscillating tool is reduced, wherein said oscillating tool assembly is oscillated with a voice coil assembly responsive to a second drive signal, said drive circuit's first input varying with said second drive signal.

2. The apparatus of claim 1, wherein said driving means is a voice coil assembly which comprises a housing and an armature which moves in response to said first drive signal.

3. The apparatus of claim 2, wherein the mass of said oscillating tool assembly is less than the mass of a weight assembly comprising said weight and any components which are coupled to and thus move with said weight.

4. The apparatus of claim 3, wherein said oscillating tool assembly oscillates at a frequency $f_1$, has a mass $M_1$, an acceleration $A_1$, a velocity $V_1$, produces a force $F_{A1}$ given by $M_1*A_1$, a force $F_{V1}$ given by $k_1*V_1$ where $k_1$ is a constant which is a function of the system mechanics, and a combined force $F_1=F_{A1}F_{V1}$, and said weight assembly is oscillated at a frequency $f_2$, has a mass $M_2$, an acceleration $A_2$, a velocity $V_2$, produces a force $F_{A2}$ given by $M_2*A_2$, a force $F_{V2}$ given by $k_2*V_2$ where $k_2$ is a constant, and a combined force $F_2=F_{A2}+F_{V2}$, said drive circuit arranged to drive said weight assembly such that $f_1$ is equal to $f_2$ and $F_2$ is equal to $-F_1$.

5. The apparatus of claim 1, further comprising a centering means which prevents said weight from moving to either end of said linear slide.

6. The apparatus of claim 5, wherein said centering means comprises a position sensor arranged to produce an output which varies with the position of said weight, said drive circuit arranged to receive said position output and to provide said first drive signal such that said weight is prevented from moving to either end of said linear slide.

7. The apparatus of claim 6, wherein said position sensor comprises a linear variable differential transformer (LVDT).

8. The apparatus of claim 1, further comprising an accelerometer mounted to said machine frame and an interface circuit connected to said accelerometer such that said accelerometer produces an output of which varies with the vibration level of said frame.

9. An apparatus for reducing the vibration transferred to a machine frame by an oscillating tool assembly supported by said frame, said tool oscillating along a first axis, comprising:

a machine frame, an oscillating tool assembly mounted to said frame which oscillates at a frequency $f_1$, has a mass $M_1$, an acceleration $A_1$, a velocity $V_1$, produces a force $F_{A1}$ given by $M_1 * A_1$, a force $F_{V1}$ given by $k_1 * V_1$ where $k_1$ is a constant which is a function of the system mechanics, and a combined force $F_1 = F_{A1} F_{V1}$, said oscillating tool assembly oscillated with a voice coil responsive to a first drive signal, a linear sliding means mounted to said frame, a weight mounted on said sliding means, a voice coil assembly comprising a housing and an armature, said armature coupled to said weight and arranged to oscillate said weight on said sliding means along said first axis in response to a second drive signal, said weight, armature, and any other components which are coupled to and move with said weight comprising a weight assembly which is oscillated at a frequency $f_2$, has a mass $M_2$, an acceleration $A_2$, a velocity $V_2$, produces a force $F_{A2}$ given by $M_2 * A_2$, a force $F_{V2}$ given by $k_2 * V_2$ where $k_2$ is a constant which is a function of the system mechanics, and a combined force $F_2 = F_{A2} F_{V2}$, and a drive circuit which provides said second drive signal and which receives a first input which is proportional to $A_1$ and a second input which is directly proportional to $V_1$, said drive circuit arranged such that said second drive signal varies with said first and second inputs to drive said weight assembly such that $f_1$ is about equal to $f_2$ and $F_2$ is about equal to $-F_1$ and thereby reduce vibration induced in said frame by said oscillating tool, wherein said drive circuit's first input varies with said first drive signal.

10. The apparatus of claim 9, further comprising a centering means which prevents said weight from moving to either end of said linear slide.

11. The apparatus of claim 10, wherein said centering means comprises a position sensor arranged to produce an output which varies with the position of said weight, said drive circuit arranged to receive said position output and to provide said second drive signal such that said weight is prevented from moving to either end of said linear slide.

12. The apparatus of claim 11, wherein said position sensor comprises a linear variable differential transformer (LVDT).

13. The apparatus of claim 9, further comprising an accelerometer mounted to said frame and an interface circuit connected to said accelerometer such that said accelerometer produces an output which varies with the vibration level of said frame.

14. The apparatus of claim 9, wherein said linear sliding means moves with said weight and is supported with air bearings mounted to said machine frame.

15. An apparatus for reducing the vibration transferred to a machine frame by an oscillating tool assembly supported by said frame, said tool oscillating along a first axis, comprising:

a machine frame, an oscillating tool assembly mounted to said frame which oscillates at a frequency $f_1$, has a mass $M_1$, an acceleration $A_1$, a velocity $V_1$, produces a force $F_{A1}$ given by $M_1 * A_1$, a force $F_{V1}$ given by $k_1 * V_1$ where $k_1$ is a constant which is a function of the system mechanics, and a combined force $F_1 = F_{A1} + F_{V1}$, said oscillating tool assembly oscillated with a voice coil responsive to a first drive signal, a linear sliding means mounted to said frame, a weight mounted on said sliding means, a voice coil assembly comprising a housing and an armature, said armature coupled to said weight and arranged to oscillate said weight on said sliding means along said first axis in response to a second drive signal, said weight, armature, and any other components which are coupled to and move with said weight comprising a weight assembly which is oscillated at a frequency $f_2$, has a mass $M_2$, an acceleration $A_2$, a velocity $V_2$, produces a force $F_{A2}$ given by $M_2 * A_2$, a force $F_{V2}$ given by $k_2 * V_2$ where $k_2$ is a constant which is a function of the system mechanics, and a combined force $F_2 = F_{A2} F_{V2}$, and a drive circuit which provides said second drive signal and which receives a first input which is proportional to $A_1$ and a second input which is directly proportional to $V_1$, said drive circuit arranged such that said second drive signal varies with said first and second inputs to drive said weight assembly such that $f_1$ is about equal to $f_2$ and $F_2$ is about equal to $-F_1$ and thereby reduce vibration induced in said frame by said oscillating tool, wherein said oscillating tool assembly is arranged to machine spectacle lens blanks.

16. An apparatus for reducing the vibration transferred to a machine frame by an oscillating tool assembly supported by said frame, said tool oscillating along a first axis, comprising:

a machine frame, an oscillating tool assembly mounted to said frame which oscillates at a frequency $f_1$, has a mass $M_1$, an acceleration $A_1$, a velocity $V_1$, produces a force $F_{A1}$ given by $M_1 * A_1$, a force $F_{V1}$ given by $k_1 * V_1$ where $k_1$ is a constant which is a function of the system mechanics, and a combined force $F_1 = F_{A1} + F_{V1}$, said oscillating tool assembly oscillated with a voice coil responsive to a first drive signal, a linear sliding means mounted to said frame, a weight mounted on said sliding means, a voice coil assembly comprising a housing and an armature, said armature coupled to said weight and arranged to oscillate said weight on said sliding means along said first axis in response to a second drive signal, said weight, armature, and any other components which are coupled to and move with said weight comprising a weight assembly which is oscillated at a frequency $f_2$, has a mass $M_2$, an acceleration $A_2$, a velocity $V_2$, produces a force $F_{A2}$ given by $M_2 * A_2$, a force $F_{V2}$ given by $k_2 * V_2$ where $k_2$ is a constant which is a function of the system mechanics, and a combined force $F_2 = F_{A2} F_{V2}$, and a drive circuit which provides said second drive signal and which receives a first input which is proportional to $A_1$ and a second input which is directly proportional to $V_1$, said drive circuit arranged such that said second drive signal varies with said first and second inputs to drive said weight assembly such that $f_1$ is about equal to $f_2$ and $F_2$ is about equal to $-F_1$ and thereby reduce vibration induced in said frame by said oscillating tool, wherein said drive circuit comprises:

first and second operational amplifiers which receive, buffer, and provide gain for said first and second inputs, respectively, a first potentiometer connected between the output of said first operational amplifier and a circuit common point, a second potentiometer connected between the output of said second operational amplifier and a circuit common point, a summing node, first and second resistors connected between said summing node and the taps of said first and second potentiometers, and a third operational amplifier connected to buffer the signal at said summing node and produce said second drive signal.

17. The apparatus of claim 16, further comprising a centering means which prevents said weight from moving to either end of said linear slide, said centering means comprising a position sensor arranged to produce an output which varies with the position of said weight, said drive circuit further comprising:

a position-integral-differential (PID) control circuit which receives a signal representative of a target position at one input and said position sensor output at a second input and which produces an output that varies with the difference between said target position signal and said position sensor output, and a resistor connected between the output of said PID control circuit and said summing node, said drive circuit arranged such that said second drive signal includes a component which maintains the position of said weight near said target position.

18. A method of reducing the vibration transferred to a machine frame by a tool assembly having a mass $M_1$ and which oscillates along a first axis and is supported by said frame, comprising:

sensing the velocity $V_1$ of said oscillating tool assembly, sensing the acceleration $A_1$ of said oscillating tool assembly, and oscillating a weight assembly having a mass $M_2$ along said first axis such that said weight assembly produces a force about equal to $-((M_1*A_1)+(k*V_1))$ where k is a constant which is a function of the system mechanics, such that vibration induced in said frame by said oscillating tool is reduced, wherein said weight assembly moves along a linear sliding means, said method further comprising:
sensing the position of said weight assembly, and
preventing said weight assembly from moving to either end of said linear sliding means.

19. A method of reducing the vibration transferred to a machine frame by a tool assembly having a mass $M_1$ and which oscillates along a first axis and is supported by said frame, comprising:

sensing the velocity $V_1$ of said oscillating tool assembly, sensing the acceleration $A_1$ of said oscillating tool assembly, oscillating a weight assembly having a mass $M_2$ along said first axis such that said weight assembly produces a force about equal to $-((M_1*A_1)+(k*V_1))$ where k is a constant which is a function of the system mechanics, such that vibration induced in said frame by said oscillating tool is reduced, sensing the vibration of said frame, and adjusting the oscillation of said counterforce assembly to reduce said sensed vibration.

* * * * *